United States Patent

Zierler

[11] Patent Number: 5,811,016
[45] Date of Patent: Sep. 22, 1998

[54] METHOD AND APPARATUS FOR REMOVING SAND FROM WASTE WATER LOADED WITH SAND AND ORGANIC SUBSTANCES

[75] Inventor: Franz Zierler, Bad Ischl, Austria

[73] Assignee: Noggerath Holding GmbH & Co. KG., Ahnsen, Germany

[21] Appl. No.: 596,168

[22] PCT Filed: Aug. 5, 1994

[86] PCT No.: PCT/AT94/00108

§ 371 Date: Apr. 10, 1996

§ 102(e) Date: Apr. 10, 1996

[87] PCT Pub. No.: WO95/05230

PCT Pub. Date: Feb. 23, 1995

[30] Foreign Application Priority Data

Aug. 13, 1993 [AT] Austria .................................... 1618/93

[51] Int. Cl.[6] .................................................. B01D 21/00
[52] U.S. Cl. .......................... 210/772; 210/796; 210/800; 210/805; 210/194; 210/205; 210/207; 210/208; 210/515; 210/519; 210/523; 210/532.1
[58] Field of Search ..................................... 210/194, 205, 210/207, 208, 218, 219, 513, 515, 519, 523, 532.1, 796, 800, 805, 806, 767, 772; 100/117, 118, 119; 422/227

[56] References Cited

U.S. PATENT DOCUMENTS 1,959,917   6/1934   Harrell ..................................... 210/112
2,933,187   4/1960   Old .
3,940,252   2/1976   Reinhardt et al. ...................... 422/227

FOREIGN PATENT DOCUMENTS 2108715   5/1972   France .
2595053   2/1987   France .
1442449   9/1965   Germany .
7212429   3/1974   Netherlands .

OTHER PUBLICATIONS

Translation of Netherlands Patent 7212429, Mar. 1974.

*Primary Examiner*—David A. Reifsnyder
*Attorney, Agent, or Firm*—Anderson Kill & Olick, P.C.

[57] ABSTRACT

There are described a method of and an apparatus for removing sand from waste water loaded with sand and organic substances which is set forth in circulation in a vertical container (1) in which the organic substance moves upward to an overflow (13), while the sand sinks downward toward a discharge conveyor (3) connected to the container (1) from beneath, and is discharged after a certain settling period. To achieve a substantial separation of the sand and the organic substances, the settled sand is stirred by an agitator, with simultaneous rinsing with fresh water delivered to the container bottom region, and is discharged in an amount, which insures a predetermined minimal height of the settled sand.

6 Claims, 2 Drawing Sheets

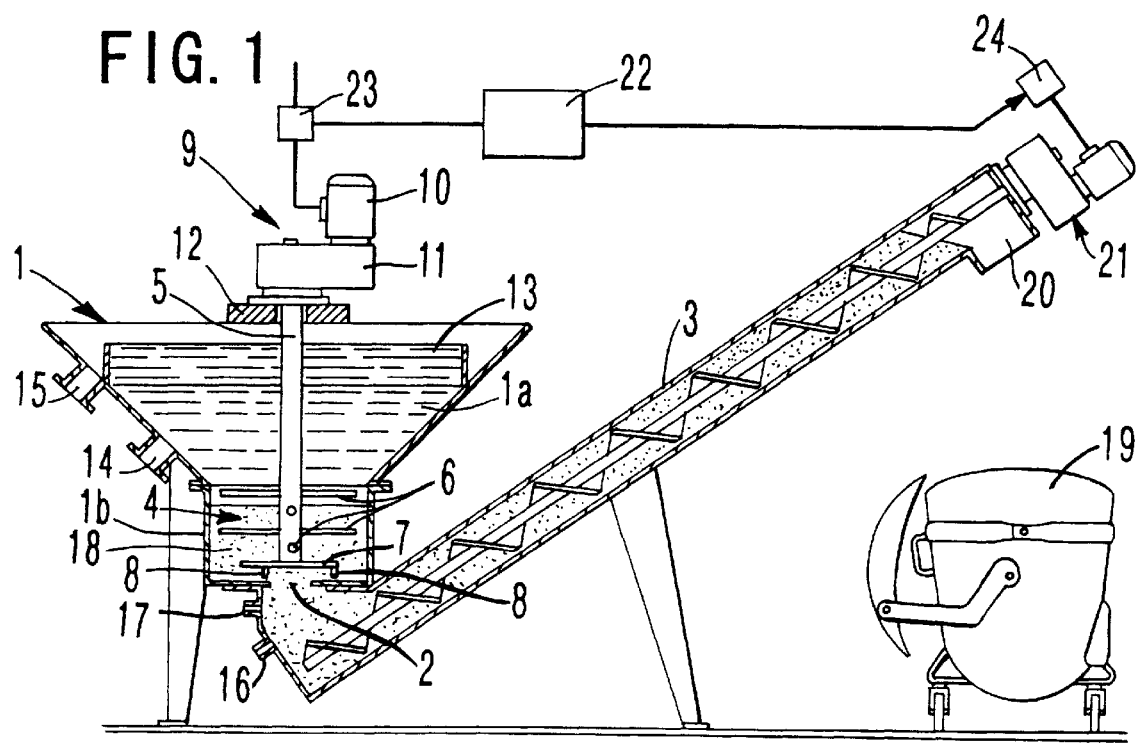
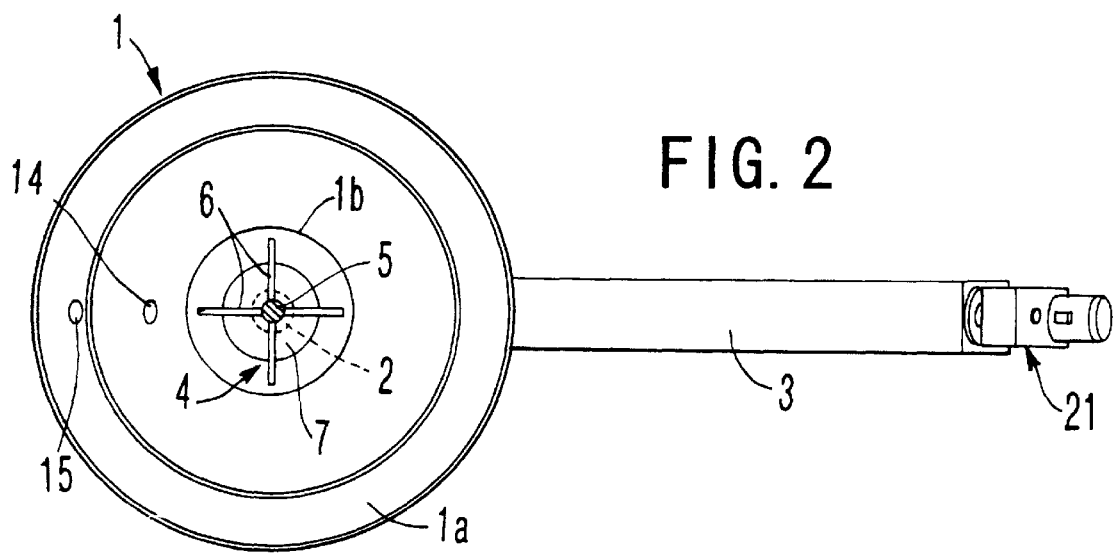

METHOD AND APPARATUS FOR REMOVING SAND FROM WASTE WATER LOADED WITH SAND AND ORGANIC SUBSTANCES

The invention relates to a method of removing sand from a waste water loaded with sand and organic substances and which is set forth in circulation in a vertical container in which the organic substance moves upward, while the sand sinks downward toward a discharge conveyor connected to the container from beneath, and is discharged only after a certain settling period, as well as to the apparatus for effecting the method.

In clarification plants, usually, sand which is rinsed together with the waste water, is separated from likewise rinsed harmful organic substances. To this end, sand which is collected in a collecting reservoir, together with organic substances, is pumped into a sand separator. This sand separator consists essentially of a vertical mostly funnel-shaped container having an overflow for the waste water loaded with organic substances in its upper region and to which, in the region of a discharge opening, a discharge conveyor is connected from beneath. The discharge conveyor is formed as a screw conveyor and extends upward at an angle so that the discharge end is located above the height of the overflow. Due to a particular shape of the inlet for the waste water, which is loaded with sand and organic substances, a rotating stream is created inside the container in which the characteristically lighter inorganic materials are displaced upward, while the characteristically heavy sand sinks downward toward the discharge conveyor. The upward movable organic substance the ascending of which is promoted by the injection of air in the form of air bubbles, is removed from the container together with the overflowing waste water. The sand, which settled in the region of the conveyor bottom, can be removed by the discharge conveyor with the accompanying draining of the sand because the discharge end of the conveyor is located higher than the container overflow. For discharging of sand, a stepwise drive of the discharge conveyor is recommended to insure sufficient settling time for the separation of a significant amount after each introduction of waste water. A drawback of the known method of removing sand from waste water loaded with sand and organic substances consists primarily in that the discharged sand is still loaded to some extent with organic substances which excludes a further use of the sand, e.g., as a bulk material in construction. The sand removed from the waste water in this way should rather be treated as a hazardous waste and put away, which is very expensive.

Accordingly, the object of the invention is to so improve the above-described method of removing sand from waste water loaded with sand and organic substances that the discharged sand contains only an insignificant residual amount of organic substances and can be used in construction and for similar purposes.

The object of the invention is solved by mechanically stirring the settled sand with simultaneous rinsing with fresh water, which is fed from beneath, and by discharging an amount that insures a predetermined minimal height of the settled sand.

The mechanical stirring of the sand, which settled in the container bottom region, achieves not only additional stratification effect with a resulting layered formation of the deposit with characteristically heavier particles being located in the lower layer and the characteristically lighter particles being located in the upper layer, but also a mechanical purification of sand by insuring rubbing of the sand grains off each other so that the organic substance, which is adhered to the sand grains, rubs off and can be carried away from the deposit by fresh water, fed from beneath, to be removed from the container with the stream of the waste water over the overflow.

The velocity of the upward flow, which is created by the unloaded rinsing water should not exceed the sinking velocity of the sand grains in order not to disturb the deposition of the sand grain in the bottom region. In addition, the sand, which settled in the bottom region, forms a stop for the organic substance which thereby cannot reach the inlet of the discharge conveyor. The prerequisite for this consists in that the height of the sand deposit in the container bottom region does not fall below a minimal dimension. To insure obtaining of such vertical sand cake, the sand should only be discharged in an amount which at most corresponds to the excess of sand over the minimal height.

For effecting the method according to the invention, an apparatus can be used which consists of a vertical container with an overflow for the waste water loaded with the organic substances, and a discharge conveyor connected with the lower discharge opening of the container. In addition, the container should include an agitator extending up to the bottom region, and a fresh water supply provided in the bottom region. To this, a control block for controlling the discharge conveyor drive is provided which controls the discharge conveyor drive dependent on the height of the sand deposit in the container. The control block takes care of providing a sufficient minimal height of the sand deposit in the container bottom region by turning off the discharge container drive when the height of the deposited sand cake falls beneath the minimal height.

The feeding of the waste water loaded with the sand and organic substances to the container can be effected continuously or in batch quantities. The important thing is that the sand deposit should not fall below a predetermined minimal height and is selected dependent on the fed waste water. In case no empiric value is available, this minimal height can be determined by simple experiments.

The height of the sand deposit in the container can be determined in different ways. Because the evaluation of the sand deposit height with the aid of fillers arranged in the container presents certain difficulties, it is proposed to control the discharge conveyor drive with a control block dependent on the load of the agitator drive. With an increase of the sand deposit height the resistance to stirring also increases which is noticeable in the increased load of the agitator drive, which can easily be determined and can be used for controlling the discharge conveyor. An especially simple implementation is available in connection with the use of an electromotor for the agitator drive as, in this case, the discharge conveyor drive can be controlled dependent on current consumption of the electromotor of the agitator drive.

To provide for uniform formation of the sand cake, on one hand, and for uniform discharge of the deposited sand, on the other hand, in a further development of the invention, the agitator, having an agitator shaft with agitator arm, can be provided with a disc supported on the agitator shaft above the discharge opening in the container bottom, which disc is provided with agitator fingers projecting downward toward the container bottom. This disc, which is located inside of the vertically extending sand cake, provides for a uniform stratification of the sand cake, in particular when the container has a cylindrical shape in the region of the discharge opening. This disc prevents the formation of a funnel during the discharge of the sand by the discharge conveyor. The fingers, which project toward the bottom, provide an advantageous stirring effect preventing the formation of obstruction bridges by sand slip stream. The disc also facilitate the distribution of the rinsing stream of the fresh water which flows, along the disc bottom over its circumference radially outward, when fed through the discharge opening in the container bottom.

To achieve, above the bottom, a uniform stirring effect with the stirring fingers, the stirring fingers can be supported on the disc at different distances from the agitator shaft so that the stirring fingers move in concentric circles.

The drawing show an example of the subject matter of the invention. In the drawings:

FIG. 1 shows a schematic axial cross-sectional view of an apparatus according to the present invention for removing sand from waste water loaded with sand and organic substances;

FIG. 2 shows a partial plan view of this apparatus; and

Figure 3:
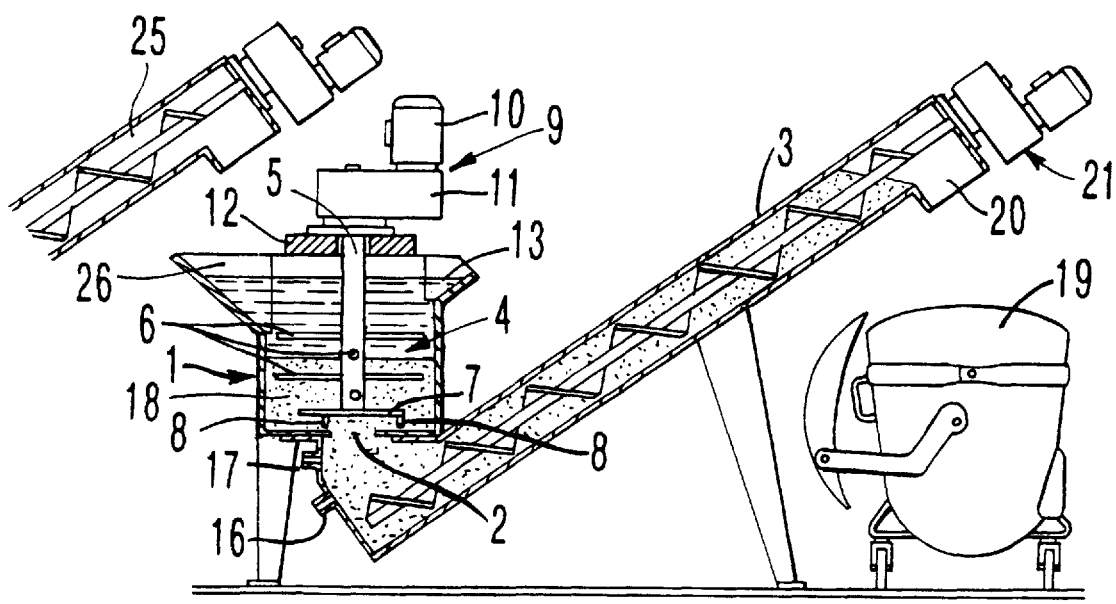
FIG. 3 shows a view corresponding to FIG. 1 of another embodiment of an apparatus.

The apparatus for removing sand from waste water, which is shown in FIGS. 1 and 2, consists essentially of a vertical container 1 having an upper conical section 1a, a lower cylindrical section 1b, and a bottom discharge opening 2 to which a discharge conveyor 3, preferably a screw conveyor, having an upwardly extending tilted portion, is connected. An agitator mechanism 4 is provided in the cylindrical section 1b of the container 1. The agitator mechanism 4 has an agitator shaft 5 with radially extending agitator arms 6 and a disc 7, which is supported on the lower end of the shaft 5 above the discharge opening 2 in a spaced relationship thereto. The disc 7 carries agitating fingers 8, which project toward the container bottom and the radial spacing of which from the shaft 5 is arbitrarily selected to insure a uniform agitation over the surface of the disc 7. The agitator drive 9 includes an electromotor 10 and a reducer 11 and is supported on a support 12 which bridges the upper container opening.

An annular overflow 13, which extends from the container wall, divides the conical section 1a into a water inlet portion and a water outlet portion, with a waste water inlet conduit 14 opening into the water inlet section and with overflow water being withdrawn through the outlet 15.

In the inlet region of the discharge conveyor 3, there is provided a fresh water inlet conduit 16 through which the fresh water can be pumped through the discharge opening 2. In addition, pressure air can be supplied through the pressure air conduit 17 to make rinsing with rinse water more effective and, thereby, to facilitate washing out of inorganic substances which, however, is only necessary in exceptional cases.

The rotatable agitator 4, on one hand, and the fresh water, which is delivered from beneath into the container 1 through the fresh water inlet conduit 16, on the other hand, set the waste water, which is pumped into the container 1 through the waste water inlet conduit 14, into circulation as a result of which the much lighter organic substances move upward to the overflow 13 while the much heavier sand grains sank toward the container bottom and form there a sand cake 18. The agitator 4 mechanically stirs the sand cake 18 so that separate grains rub off each other whereby the adhered organic substances mostly fall off. These rubbed off organic substances are carried by an upward stream, which is created by the incoming fresh water to the overflow 13, over which the organic substances are washed out from the waste water. The deposited sand cake 18 can then be carried away by the discharge conveyor 3 to a collection container 19, with simultaneous draining of the water from the carried away sand because the discharge conveyor end 20 is located higher than the overflow 13. The disc 8, which is located above the discharge opening 2 formed in container bottom, prevents the formation of a distinctive discharge funnel in the sand cake 18 the layer-shaped body of which is retained due to the sorting action of the agitator 4.

For the separation of the sand from the organic substances, it is important that the sand cake 18 always has a predetermined minimal height. This means that the discharge conveyor 3 should at best carry away an amount of sand corresponding to an amount of sand exceeding this minimal height. To reliably maintain this minimal height of the sand cake 18, the drive 21 of the discharge conveyor 3 is controlled dependent on the predetermined minimal height of the deposited sand. To this end, there is provided a control block 22 shown in FIG. 1 as a rectangle. The drive 21 of the discharge conveyor 3 is controlled dependent on current consumption of the electromotor 10 of the agitator drive 9. Because with the increase of the height of the sand cake 18, the stirring resistance and, therefore, the current consumption of the electromotor 10 increases, the control is based on signals generated by Sensor 23 which senses the current consumption of the electromotor 10. When the current consumption exceeds a predetermined upper limit, then the drive 21 of the discharge conveyor 3 is actuated by the control block 22 via the switch 24 and discharges the sand from the container 1 until the current consumption is lowered to a magnitude corresponding to a minimal height of the sand cake 18, which leads to the turning off of the discharge conveyor 3.

The apparatus shown in FIG. 3 distinguishes from that of FIGS. 1 and 2 simply by the shape of the container 1 and by how the waste water is supplied and discharged. A substantially cylindrical container 1 is provided to which the waste water is delivered by a screw conveyor 25 located above the inlet 5. The overflow 13 is formed by an outlet 13. The operation, with regard to the sand separation from the organic substances, remains the same. It is likewise based on retaining a corresponding sand cake 8 which, on one hand, provides for rubbing off of organic substances and, on the other hand, prevents, in combination with unstressed rinsed liquid, escape of the organic substances through the discharge opening 2.

Such an apparatus, having a container with a diameter of 80 cm and a height of 65 cm, permits to separate, e.g., 800 kg of sand from waste water loaded approximately with the same amount of sand and organic substances in 5 hours. The agitator would be driven with a speed of 4–5 revolutions per min. The rinse water would be supplied in an amount of 0.35 l/sec. The minimal height of a vertical sand cake would amount to 12 cm. The discharge conveyor would be actuated upon the height of the deposited sand reaching 30 cm. Analysis of the separated sand, upon drying to a constant weight, showed a water content of 5.2% by weight and content of organic substances of 1.7% by weight. The portion of the organic substances can be further reduced by increasing the processing time in the container.

I claim:

1. A method of removing sand from waste water loaded with sand and organic substances, the method comprising the steps of:

circulating waste water in a vertical container, with the organic substances being movable upward to an overflow and the sand sinking downward to a bottom region of the vertical container;

mechanically stirring the sand which settled in the bottom region of the container;

simultaneously, rinsing the stirable sand with fresh water delivered through a sand discharge opening provided in a bottom of the container;

controlling discharge of the sand from the bottom region of the container through the sand discharge opening dependent on a settling height of the sand in the bottom region of the container so that a predetermined minimal height of the settled sand in the bottom region of the container is insured.

2. An apparatus for removing sand from waste water loaded with sand and organic substances, the apparatus comprising:

a vertical container for circulating waste water and having an upper region provided with an overflow, through which the organic substances are removed, and a bottom region in which sand settles;

means provided in the container and extending toward the bottom region of the container for mechanically stirring settled sand;

means for delivering fresh water through a sand discharge opening provided in a bottom of the container for rinsing the settled and stirable sand;

a discharge conveyor connected to the discharge opening for removing the sand from the bottom region of the container, the discharge conveyor having a drive; and means for controlling the drive of the discharge conveyor dependent on a settling height of the sand in the bottom region of the container so that a predetermined minimal height of the settled sand is retained in the bottom region of the container.

3. An apparatus according to claim 2, wherein the controlling means controls the discharge conveyor drive in accordance with a load acting on a drive of the mechanically stirring means.

4. An apparatus according to claim 3, wherein the drive of the mechanically stirring means comprises an electromotor, and wherein the controlling means controls the discharge conveyor drive in accordance with current consumption of the electromotor.

5. An apparatus according to claim 2, wherein the mechanically stirring means comprises an agitator having a shaft, agitator arms supported on the shaft, and a disc supported on the shaft and arranged above the discharge opening of the container and having fingers projecting downward toward the container bottom.

6. An apparatus according to claim 5, wherein the fingers are arranged on the disc at different distances from the shaft.

* * * * *